US006606239B2

(12) United States Patent
Takahashi et al.

(10) Patent No.: US 6,606,239 B2
(45) Date of Patent: Aug. 12, 2003

(54) CIRCUIT BREAKER

(75) Inventors: Tatsunori Takahashi, Saitama (JP); Naoshi Uchida, Saitama (JP); Katsunori Kuboyama, Saitama (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 10/302,951

(22) Filed: Nov. 25, 2002

(65) Prior Publication Data

US 2003/0086233 A1 May 8, 2003

Related U.S. Application Data

(63) Continuation of application No. 09/635,628, filed on Aug. 10, 2000, now abandoned.

(30) Foreign Application Priority Data

Aug. 23, 1999 (JP) .......................................... 11-235175

(51) Int. Cl.[7] .................................................. H02B 1/00

(52) U.S. Cl. ...................................................... 361/600

(58) Field of Search ................................ 361/600, 624, 361/625, 634, 673, 728, 730, 732, 824

(56) References Cited

U.S. PATENT DOCUMENTS 5,459,444 A * 10/1995 Baer et al. .................... 335/18
6,064,001 A * 5/2000 Ulerich et al. ................ 361/13
6,301,095 B1 * 10/2001 Laughlin et al. ............ 361/624
6,410,844 B1 * 6/2002 Bruner et al. ............... 361/826

* cited by examiner

*Primary Examiner*—Edward H. Tso
*Assistant Examiner*—Pia Tibbits
(74) *Attorney, Agent, or Firm*—Kanesaka & Takeuchi

(57) ABSTRACT

A circuit breaker is formed of a main body case made of resin and divided into a lower case, an upper cover, and an intermediate case, into which parts of the circuit breaker are integrated. The intermediate case has pocket shaped sockets formed on a top surface side thereof, into which the tips of the interphase partition walls provided in the upper cover are fitted. Also, the intermediate case has recessed grooves formed on a bottom surface side thereof to fit over upper edges of the interphase partition walls provided in the lower case. Thus, the circuit breaker can be assembled easily and becomes more rigid.

9 Claims, 5 Drawing Sheets

CIRCUIT BREAKER

CROSS-REFERENCE TO RELATED APPLICATION

This is a continuation in part application of Ser. No. 09/635,628 filed on Aug. 10, 2000 now abandoned.

BACKGROUND OF THE INVENTION AND RELATED ART STATEMENT

The present invention relates to a circuit breaker directed for a wiring circuit breaker or motor breaker for starting and stopping a motor or providing protection from overcurrent and, in particular, to an assembly structure of a main body case of a circuit breaker.

First, a circuit breaker for a three-phase circuit including main circuit contact shoes based on two-contacts bridging type is taken as an example, and the assembly structure of a conventional example thereof is shown in FIG. 5. In this figure, reference numeral 1 denotes a main-body case formed of a resin molding that is divided into three parts including a lower case 1*a*, an upper cover 1*b*, and an intermediate case 1*c*; reference numeral 2 denotes a power supply side main circuit terminal corresponding to each phase; reference numeral 3 denotes a load side main circuit terminal; reference numeral 4 denotes one of the fixed contact shoes connected to a conductor of the main circuit terminal 2; reference numeral 5 denotes the other fixed contact shoe; reference numeral 6 denotes a movable contact shoe for bridging the fixed contact shoes 4 and 5; reference numeral 7 denotes a movable contact shoe holder; reference numeral 7*a* denotes a contact spring; reference numeral 8 denotes a cage for guiding and supporting the movable contact shoe holder 7 in the opening and closing directions; reference numeral 9 denotes an arc-extinguishing plate; reference numeral 10 denotes an opening and closing lever for driving the movable contact shoe 6; reference numeral 11 denotes a toggle type contact shoe opening and closing mechanism including an opening and closing lever 10; reference numeral 12 denotes a manual operation handle; reference numeral 13 denotes an overcurrent trip device comprising a combination of a solenoid trip device 13*a* that operates instantaneously in response to a short circuit current or the like and a bimetal type thermal trip device 13*b* that performs a time limit operation in response to an overload current, the overcurrent trip device 13 being interposed and connected in series between the fixed contact shoe 5 and the load side main circuit terminal 3. An activation piece 13*c* of the overcurrent trip device 13 links with the contact-shoe opening and closing mechanism 11 via a trip cross bar and a latch receiver.

The lower case 1*a* of the main-body case 1 has contact shoe mechanisms and arc extinguishing plates for each phase in the lateral direction, and interphase partition walls or barriers molded integrally with the case so as to insulate and isolate the phases. The upper cover 1*b* also has interphase partition walls formed integrally at the front and rear ends thereof so as to insulate and isolate the main circuit terminals 2 for each phase. Furthermore, the main body case is assembled by mounting the opening and closing mechanisms 11 and the overcurrent trip devices 13 in the intermediate case 1*c*, and fitting the intermediate case 1*c* onto the lower case 1*a*.

The operation of this circuit breaker is well known. When the operation handle 12 is placed in the ON position, the opening and closing lever 10 recedes, and the movable contact shoe 6 is urged by the contact spring 7*a* so as to elevate with the holder 7. The movable contact shoe 6 then comes in contact with the fixed contact shoes 4, 5 to close the circuit. In this closed circuit state, a main circuit current flows from the power supply side main circuit terminal 2 through the fixed contact shoe 4, the movable contact shoe 6, the fixed contact shoe 5, and the overcurrent trip device 13, in that order, to the load side main circuit terminal 3. Alternatively, when the operation handle 12 is moved in the opposite direction to be placed in the OFF position, the contact shoe opening and closing mechanism 11 drives the opening and closing lever 10 clockwise to push the movable contact shoe holder 7 downward. This causes the movable contact shoe 6 to be separated from the fixed contact shoes 4, 5 so as to open the main circuit contacts. On the other hand, when an overload current or a short circuit current flows through the main circuit, the overcurrent trip device 13 operates to release the latch of the contact shoe opening and closing mechanism 10, whereby the opening and closing lever 10 drives the movable contact shoe 6 in the opening direction so as to cut off the main-circuit current.

The main body case 1 of the circuit breaker, which is constructed by assembling the lower case 1*a*, the upper cover 1*b*, and the intermediate case 1*c* as described above, must be assembled easily, must be sufficiently rigid to accommodate a robot-based automatic assembly method, and must also have an assembly structure that can maintain an interphase insulation proof, specified in the regulations, between the main-circuit terminals for each phase.

The above-described conventional body case 1, however, has an assembly structure obtained by assembling the above-described parts in each of the lower case 1*a*, the upper cover 1*b*, and the intermediate case 1*c*; placing the parts at the upper cover 1*b* and the intermediate case 1*c* on the lower case 1*a*; and fastening them together using screws. In addition, each divided case includes no positioning or holding means for assembling with other divided case in a predetermined assembled position. Thus, a positioning operation for sequentially placing the intermediate case 1*c* and the upper cover 1*b* on the lower case 1*a* in the assembly process is cumbersome, and before being fastened together by using the screws, the divided cases, which overlap one another, may shift during transfer between the assembly steps. Alternatively, if there is a dimensional error or assembly error in the divided cases, a gap is created between the end surface of the interphase partition wall and the corresponding part that overlaps the end surface when the main body case is assembled. Thus, the required creepage distance of the insulation is not obtained between the main-circuit terminals for each phase.

The present invention has been made in view of the above points, and it is an object thereof to solve these problems in order to provide a rigid circuit breaker that can be assembled easily and that has an improved main body case assembly structure so as to allow the main circuit terminals for the respective phases to be sufficiently insulated.

SUMMARY OF THE INVENTION

To attain the above-described objects, the present invention provides a circuit breaker comprising main circuit terminals, fixed and movable contact shoes, arc extinguishing sections, contact shoe opening and closing mechanisms, and overcurrent trip devices for the respective phases integrated into a main-body case that constitutes a resin molding. The main body case comprises a lower case containing the contact shoes and the arc extinguishing sections for the respective phases, an intermediate case fitted on the lower case and containing power supply and load side main circuit terminal lead-out sections at the front and rear ends of the case, the contact shoe opening and closing mechanisms and the overcurrent trip devices for the respective phases, and an upper cover covering the intermediate case. The lower case and the upper cover have interphase partition walls formed integrally therewith so as to separate the phases. The intermediate case has pocket shaped sockets formed on a top-surface side thereof, in which the tips of the interphase partition walls of the upper cover are fitted when the main-body case is assembled, and the intermediate case also has recessed groove sections formed on a bottom-surface side thereof that fit over the upper edges of the interphase partition walls provided in the lower case. The embodiments are formed as follows.

(1) The main body case is assembled by assembling the upper cover and the lower case so that they surround the intermediate case, and by allowing the side walls of the upper cover to abut vertically against the end surfaces of the side walls of the lower case.

(2) The interphase partition walls formed in the upper cover and the sockets formed in the intermediate case project outward from the front and rear end surfaces of the main-body case.

With the above-described structure, when the intermediate case is fitted onto the lower case in a circuit-breaker assembly process, the upper edges of the interphase partition walls of the lower case are fitted into the recessed grooves formed on the bottom surface side of the intermediate case so that the lower case is held in its assembled position. When the upper cover is subsequently installed on the intermediate cover, the tips of the interphase partition walls of the upper cover are fitted into the sockets formed on the top surface side of the intermediate case so as to be held in position. Consequently, the divided cases can be positioned easily in the assembly process, and when they are stacked one another, the interphase partition walls of the lower case and upper cover are fitted into the grooves of the intermediate case so that the lower case and the upper cover are held in their assembly positions. As a result, the main body case becomes more rigid and is prevented from shifting from its assembled position during transfer between assembly steps. In addition, the interphase partition walls have tips that overlap the corresponding parts, that is, the sockets and recessed grooves of the intermediate case, so that a small dimensional error can be absorbed to maintain the required creepage distance of the insulation between the main circuit terminals for each phase, thereby achieving improved insulation.

DETAILED DESCRIPTION OF THE PREFERRED EMBODIMENT

Figure 1:
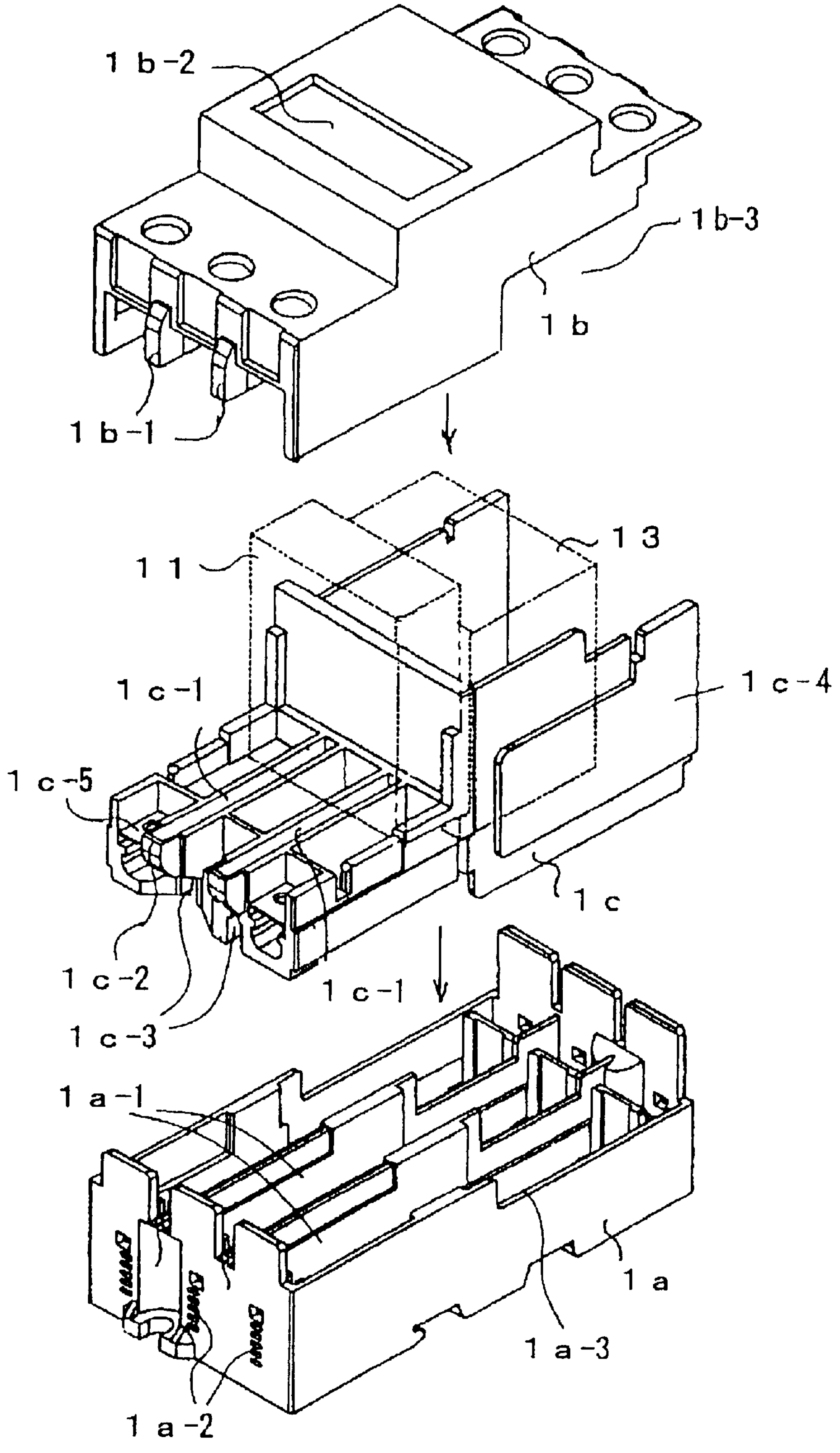
FIG. 1 is an exploded perspective view of a circuit breaker main body case showing a structure of an example of the present invention.

Embodiments of the present invention will be described below with reference to examples shown in FIGS. 1 to 4. The members shown in the figures for the corresponding examples and corresponding to those in FIG. 5 bear the same reference numerals, and detailed descriptions thereof are omitted.

In FIG. 1, reference numeral 1*a* denotes a lower case, reference numeral 1*b* denotes an upper cover, and reference numeral 1*c* denotes an intermediate case. Although not shown, the lower case 1*a* has an assembly of movable contact shoes 6 and arc extinguishing plates 9 (see FIG. 5) integrated therein, and the intermediate case 1*c* has power supply side and load side main circuit lead-out terminals 2, 3, contact shoe opening and closing mechanisms 11, and overcurrent trip devices 13 mounted therein, as described in FIG. 5.

The lower case 1*a* has rib-shaped interphase partition walls 1*a*-1 that are formed integrally therewith and extend upward perpendicularly from a bottom surface thereof so as to mutually separate the phases. Reference numeral 1*a*-2 denotes vent holes formed in the front and rear end surfaces of the case, each of which leads to an arc extinguishing chamber. The partition walls 1*a*-1 may be formed with the intermediate case 1*c*. Additionally, the upper cover 1*b* has interphase partition walls 1*b*-1 that are internally formed in the front and rear areas thereof and have front and rear ends that project from the corresponding end surfaces of the cover. The cover has a window hole 1*b*-2 formed on a top surface thereof, from which the upper ends of the contact shoe opening and closing mechanisms 11 project. The partition walls 1*b*-1 may be formed with the intermediate case 1*c*.

Figure 3:
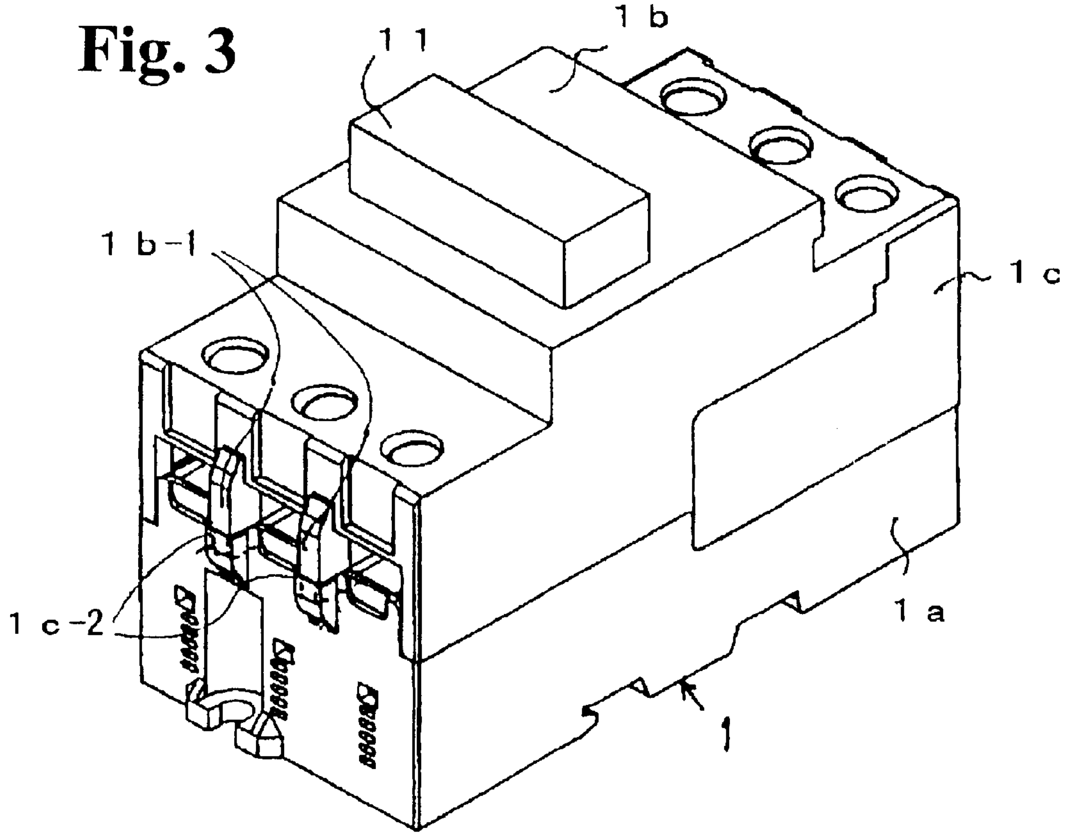
FIG. 3 is a perspective view showing the assembly of a main body case according to the example shown in FIGS. 1 and 2.

On the other hand, the intermediate case 1*c* has pocket shaped sockets 1*c*-1 that are formed on a top surface side thereof and into which the tips of the interphase partition walls 1*b*-1 of the upper cover 1*b* are fitted when the main body case 1 is assembled as shown in FIG. 3. Each of the sockets 1*c*-1 has a closed front edge and projects from an end surface of the case so as to accommodate the projection of the corresponding interphase partition wall 1*b*-1 of the upper cover 1*b*. In case the intermediate case 1*c* has the partition walls 1*b*-1, the pocket shaped sockets are formed at the upper cover. The intermediate case 1c also has recessed grooves 1*c*-3 formed on a bottom-surface side thereof, in a longitudinal direction thereof, into which the upper edges of the interphase partition walls 1*a*-1 of the lower case 1*a* are fitted. In case the intermediate case 1*c* has the partition walls 1*a*-1, the lower case 1*a* has the recessed grooves.

Figure 5:
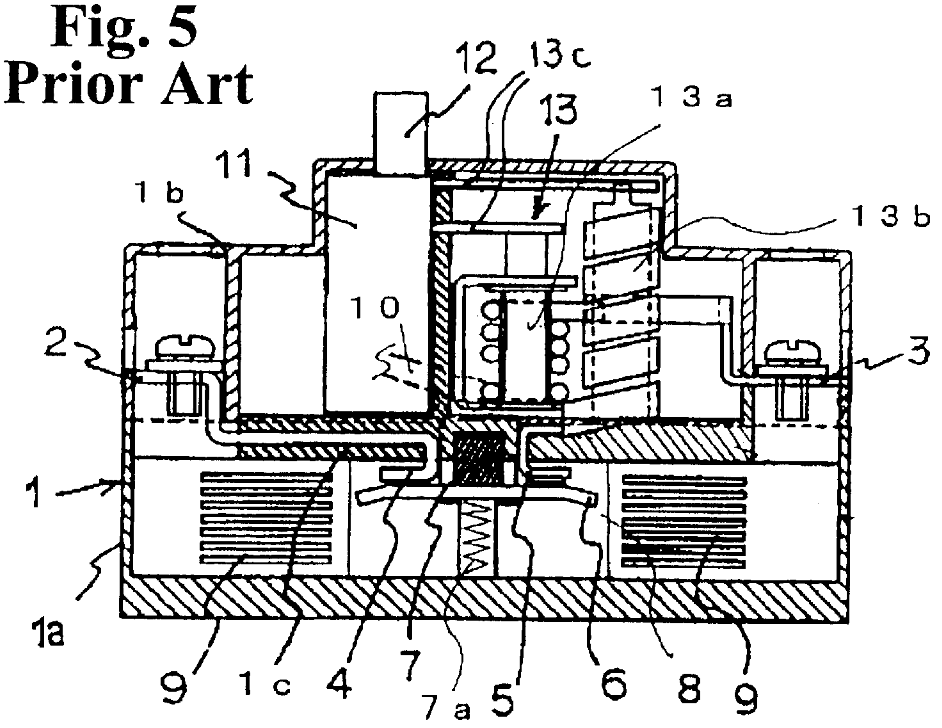
Fig. 5 Prior Art
FIG. 5 is a view showing the assembled structure of a conventional example of a two-contact bridging type circuit breaker.

Furthermore, the intermediate case 1*c* has outer wall sections 1*c*-4, each of which is formed so as to project from a rear side, i.e. load-side, wall thereof and corresponds to a notch 1*a*-3 in the lower case 1*a* and a notch 1*b*-3 in the upper cover 1*b*. In the assembled state shown in FIG. 3, the outer wall sections 1*c*-4 of the intermediate case 1*c* fit into corresponding side walls of the lower case 1*a* and upper cover 1*b* to form flat side-wall surfaces of the main body case 1. In FIG. 1, reference numeral 1*c*-5 denotes a terminal block of the main circuit, in which the terminal conductor and terminal screw shown in FIG. 5 are led out and installed.

During the assembly process for the circuit breaker, the intermediate case 1*c* is first fitted onto the lower case 1*a* from above so as to overlap in a specified position. The upper edges of the interphase partition walls 1*a*-1 of the lower case 1*a* are then fitted into the recessed grooves 1*c*-3 of the intermediate case 1*c* so that the lower case 1*a* and the intermediate case 1*c* are coupled together. The upper cover 1*b* is then installed from above, and its interphase partition walls 1*b*-1 are fitted into the sockets 1*c*-1 of the intermediate case 1*c* so that the upper case 1*b* is held in its predetermined assembled position. This results in the creation of the assembled state shown in FIG. 3. In this state, fastening screws, not shown, are used to fix the upper cover 1*b* and the lower case 1*a* together.

As is apparent from the above description, according to the assembled structure of the illustrated example, the lower case 1*a*, the upper cover 1*b*, and the intermediate case 1*c*, which are divided, are fitted together so as to maintain their predetermined assembled positions, thereby allowing the divided cases to be mutually positioned and assembled more easily and accurately during the assembly process while making the main body case more rigid in the assembled state. In addition, since the tips of the interphase partition walls 1*a*-1, 1*b*-1 separating the phases are fitted into the sockets 1*c*-1 and recessed grooves 1*c*-3 of the intermediate case 1*c* in such a manner that the wall surfaces of the interphase partition walls overlap one another in a lateral direction of the circuit breaker, the effective creepage distance of insulation between the adjacent main circuit terminals increases to ensure a high interphase insulation proof. In this case, since the interphase partition walls 1*b*-1 and ends 1*c*-2 of the sockets project forward and rearward from the end surfaces of the main body case 1, the interphase creepage distance of the insulation further increases.

Figure 2:
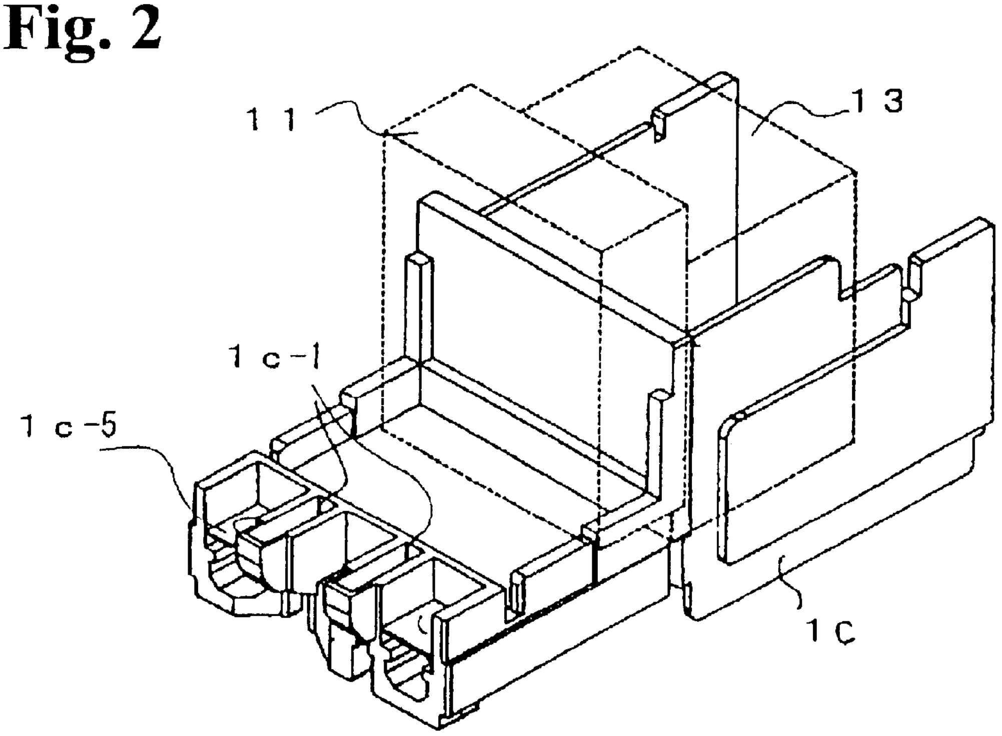
FIG. 2 is a perspective view of the structure of an intermediate case according to an applied example of the present invention.

FIG. 2 shows an applied example. In this example, the interphase insulation of the main circuit terminal lead-out sections is given top priority, and the sockets 1*c*-1 for the interphase partition walls formed on the top surface side of the intermediate case 1*c* are formed only in areas surrounding the terminal blocks 1*c*-5. Although not shown, the length of the interphase partition wall of the upper cover 1*b* is set so as to be equal to that of the socket 1*c*-1 shown in FIG. 2.

Figure 4:
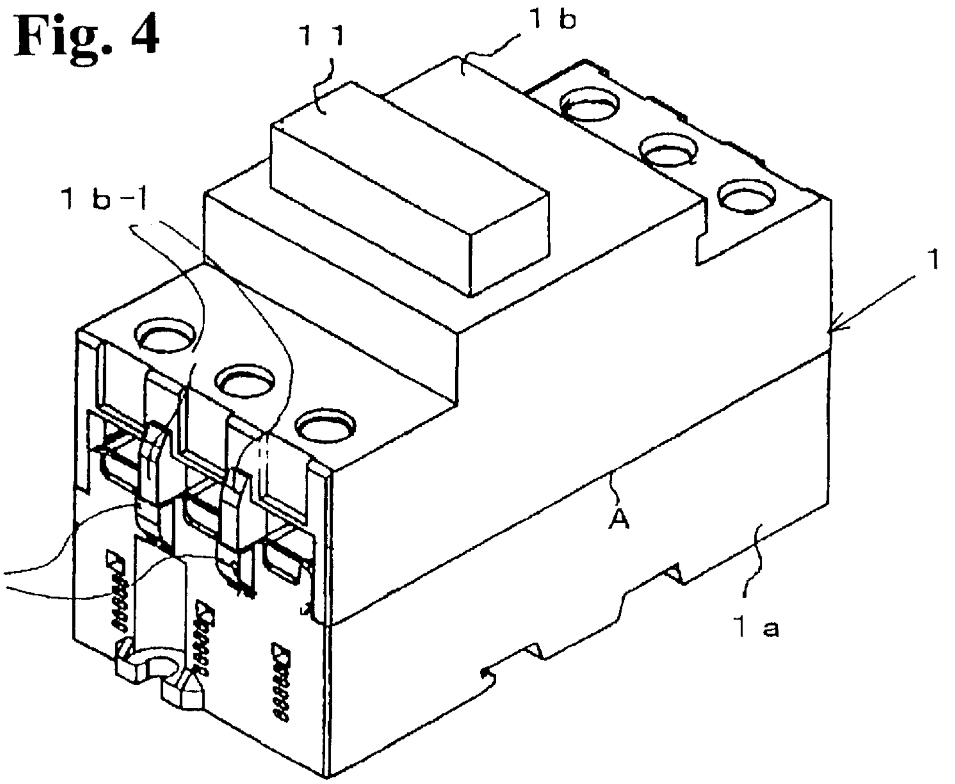
FIG. 4 is a perspective view showing the assembly of the main body case according to another applied example of the present invention.

FIG. 4 shows an assembled state of a different applied example. In this example, the intermediate case is encompassed by and integrated into the lower case 1*a* and the upper cover 1*b* in such a manner that the end surfaces of the side walls of the lower case 1*a* and upper cover 1*b* overlap one another along a linear abutment surface A, as shown in the figure. That is, the outer wall sections 1*c*-4 projecting from the side walls of the intermediate case 1*c*, the notches 1*a*-3 in the lower case 1*a*, and the notches 1*b*-3 in the upper cover 1*b* shown in FIG. 1 are not formed, but the remainder of the structure is the same as that shown in FIG. 1.

Figure 6:
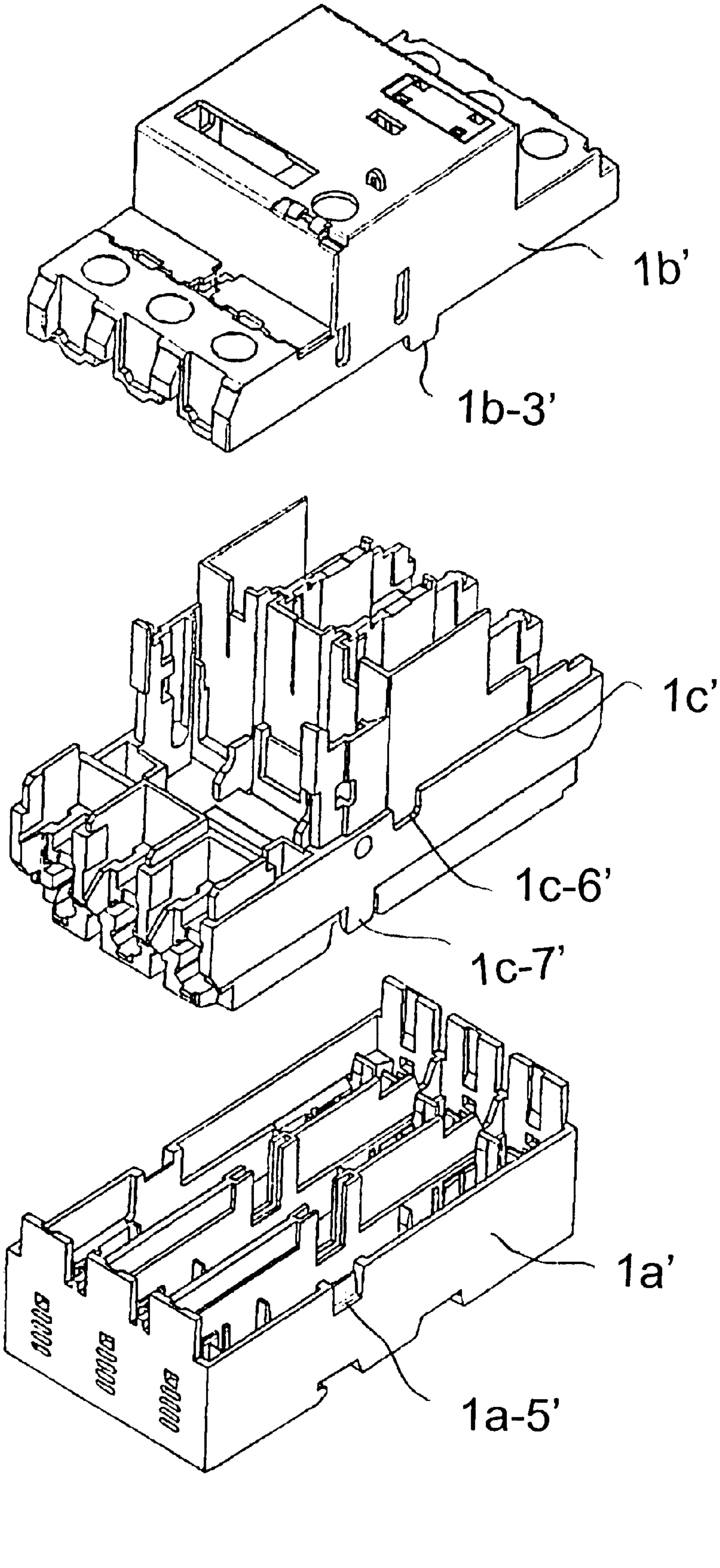
FIG. 6 is an exploded perspective view of a circuit breaker main body case according to a modified example of the present invention.
Figure 7:
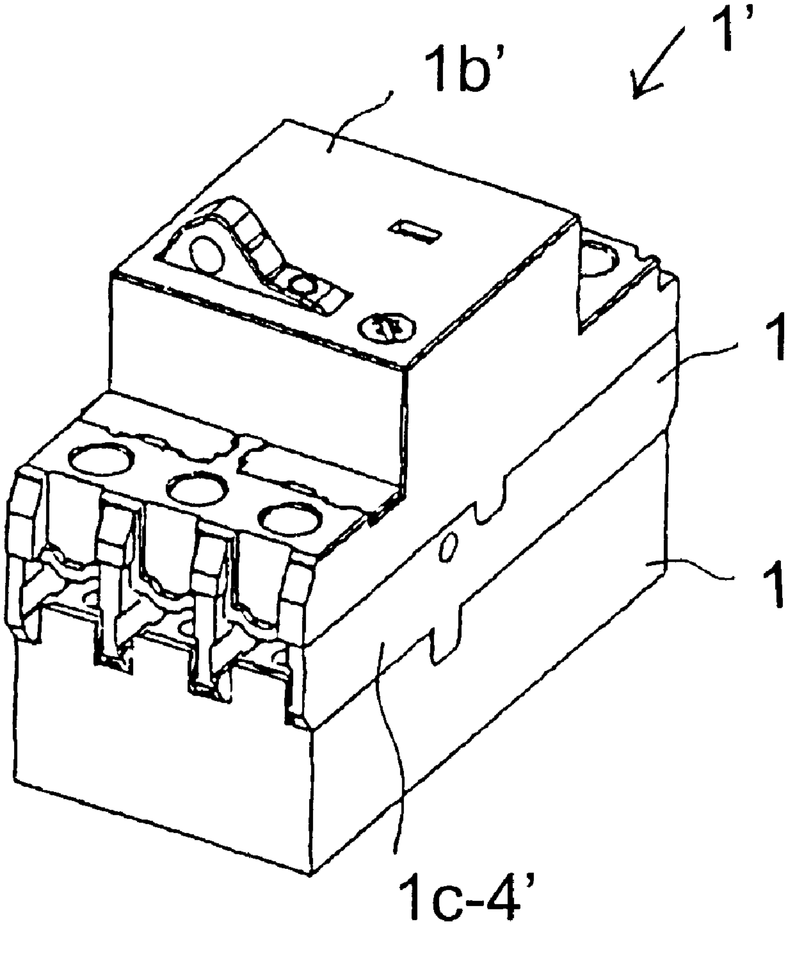
FIG. 7 is a perspective view showing the assembly of a main body case according to the modified example shown in FIG. 6.

FIGS. 6 and 7 show another embodiment of the invention, wherein a circuit breaker 1' is formed of a lower case 1*a*', an intermediate case 1*c*' and an upper cover 1*b*', similar to the circuit breaker shown in FIG. 1. In the circuit breaker 1', however, an outer wall section 1*c*-4' of the intermediate case 1*c*' extends entirely at the side portion thereof, and upper and lower edges thereof substantially entirely contact the edges of the lower case 1*a*' and upper cover 1*b*'. Namely, the notches 1*a*-3, 1*b*-3 formed in the lower case and upper cover in the first embodiment are not formed in the lower case 1*a*', 1*b*'. In order to immovably assemble the circuit breaker 1', the lower case 1*a*' includes a notch 1*a*-5', and the upper cover 1*b*' includes a projection 1*b*-3'. Also, the intermediate case 1*c*' includes a notch 1*c*-6' engaging the projection 1*b*-3', and a projection 1*c*-7' engaging the notch 1*a*-5'. The other structures of the circuit breaker 1' are the same as those of the circuit breaker of the first embodiment.

As described above, according to the structure of the present invention, the circuit breaker comprising the main body case made of the resin molding is divided into three parts, i.e. the lower case, the upper cover, and the intermediate case, into which parts of the circuit breaker are integrated, wherein the intermediate case has pocket shaped sockets formed on the top surface side thereof, into which the tips of the interphase partition walls of the upper cover are fitted when the main body case is assembled. In addition, the intermediate case has recessed grooves formed on the bottom surface side thereof, which fit over the upper edges of the interphase partition walls provided in the lower case. Thus, during the assembly process for the circuit breaker, the interphase partition walls of the lower case and upper cover are fitted into the recessed grooves and sockets, respectively, which are formed in the intermediate case, so that the lower case and upper cover are held in their assembled positions. As a result, the divided cases can be positioned easily during the assembly process, the main body case is made more rigid in the assembled state, and the creepage distance of the insulation between the main circuit terminals for each phase increases to improve insulation performance.

While the invention has been explained with reference to the specific embodiments of the invention, the explanation is illustrative and the invention is limited only by the appended claims.

What is claimed is:

1. A circuit breaker comprising:

main circuit terminals, fixed and movable contact shoes, arc extinguishing sections, contact shoe opening and closing mechanisms, overcurrent trip devices, and power and load side main circuit terminals, which are electrically connected together for a plurality of phases to constitute a circuit breaker, and a main body case made of an insulating material and including a lower case having lower interphase partition walls for separating the phases having upper edges, and sections for the contact shoes and arc extinguishing sections; an intermediate case fitted onto the lower case and having recessed grooves on a bottom surface side to receive therein the upper edges of the lower interphase partition walls, pocket shaped sockets on a top surface side thereof above the recessed grooves, and sections for the power and load side main circuit terminals, the contact shoe opening and closing mechanisms and the overcurrent trip devices; and an upper cover covering the intermediate case and having upper interphase partition walls for separating the phases having tips directing downwardly, said tips of the upper interphase partition walls being fitted into the pocket shaped sockets when the main-body case is assembled so that the upper and lower interphase partition walls are immovably held in the respective recessed grooves and sockets formed in the intermediate case when the main body case is assembled.

2. A circuit breaker according to claim 1, wherein said upper cover and the lower case surround the intermediate case to form the main body case such that the lower interphase partition walls and the upper interphase partition walls face and are fixed together through the intermediate case.

3. A circuit breaker according to claim 1, wherein said interphase partition walls formed in the upper cover and the sockets formed in the intermediate case extend from front and rear end surfaces of the main body case.

4. A circuit breaker according to claim 1, wherein said intermediate case further includes outer wall sections on two lateral sides between the power and load side main circuit terminals, said lower case and upper cover including outer wall sections and notches therein, said notches receiving the outer wall sections of the intermediate case.

5. A circuit breaker according to claim 4, wherein each of said outer wall sections of the intermediate case includes an inner side and an outer side projecting outwardly from the inner side so that when the main body case is assembled, the inner sides are located inside the outer wall sections of the lower case and upper cover, and the outer sides are located in the notches.

6. A circuit breaker according to claim 1, wherein said intermediate case further includes outer wall sections on two lateral sides between the power and load side main circuit terminals, said lower case and upper cover including outer wall sections so that when the main body case is assembled, the outer wall sections of the intermediate case are located inside the outer wall sections of the lower case and the upper cover.

7. A circuit breaker comprising:

main-circuit terminals, fixed and movable contact shoes, arc extinguishing sections, contact shoe opening and closing mechanisms, overcurrent trip devices, and power and load side main circuit terminals, which are electrically connected together for a plurality of phases to constitute a circuit breaker, and a main body case made of an insulating material and including a lower case having sections for the contact shoes and arc extinguishing sections, and lower interphase partition walls for separating the phases; an intermediate case fitted onto the lower case and having sections for the power and load side main circuit terminals, the contact shoe opening and closing mechanisms and the overcurrent trip devices; an upper cover covering the intermediate case and having upper interphase partition walls for separating the phases; first tips formed at one of the lower interphase partition walls and the intermediate case; recessed grooves formed on the other of the lower interphase partition walls and the intermediate case to receive therein the first tips second tips formed at one of the intermediate case and the upper interphase partition walls; and pocket shaped sockets formed on the other of the intermediate case and the upper interphase partition walls to receive therein the second tips so that the upper and lower interphase partition walls are immovably held by the first and second tips, recessed grooves and sockets when the main body case is assembled.

8. A circuit breaker according to claim 7, wherein said intermediate case further includes outer wall sections on two lateral sides extending between the power and load side main circuit terminals, said lower case and upper cover including outer wall sections substantially entirely contacting edges of the outer wall sections of the intermediate case.

9. A circuit breaker according to claim 8, wherein each of said outer wall sections of the intermediate case includes an inner side and an outer side projecting outwardly from the inner side so that when the main body case is assembled, the inner sides are located inside the outer wall sections of the lower case and upper cover.

* * * * *

UNITED STATES PATENT AND TRADEMARK OFFICE

CERTIFICATE OF CORRECTION

PATENT NO. : 6,606,239 B2
DATED : August 12, 2003
INVENTOR(S) : Tatsunori Takahashi et al.

It is certified that error appears in the above-identified patent and that said Letters Patent is hereby corrected as shown below:

Column 8,
Line 12, after “tips” add -- ; --.

Signed and Sealed this

Seventh Day of October, 2003

JAMES E. ROGAN
*Director of the United States Patent and Trademark Office*